US006651777B2

(12) United States Patent
Suratt

(10) Patent No.: US 6,651,777 B2
(45) Date of Patent: Nov. 25, 2003

(54) APPARATUS FOR ENHANCING ENGINE OIL CHANGES

(76) Inventor: Ted L. Suratt, 6553 46$^{th}$ St. North, #909, Pinellas Park, FL (US) 33781

( * ) Notice: Subject to any disclaimer, the term of this patent is extended or adjusted under 35 U.S.C. 154(b) by 0 days.

(21) Appl. No.: 09/682,879

(22) Filed: Oct. 29, 2001

(65) Prior Publication Data

US 2003/0079943 A1 May 1, 2003

(51) Int. Cl.[7] .................................... F16N 33/00
(52) U.S. Cl. .................................... 184/1.5; 123/196 A
(58) Field of Search .................... 123/196 A, 196 R, 123/196 S; 184/1.5, 55.1

(56) References Cited

U.S. PATENT DOCUMENTS 4,951,784 A * 8/1990 Bedi .......................... 184/1.5
5,094,201 A * 3/1992 Bedi ...................... 123/196 R
5,452,695 A * 9/1995 Bedi ...................... 123/196 A
5,526,782 A * 6/1996 Bedi et al. .............. 123/196 A
5,676,842 A * 10/1997 Bedi et al. .................. 210/739
5,900,155 A * 5/1999 Bedi .......................... 210/739
5,964,256 A * 10/1999 Bedi et al. ..................... 141/83
6,071,355 A * 6/2000 Suratt .......................... 134/21
6,213,173 B1 * 4/2001 Bedi et al. ..................... 141/65
2001/0032754 A1 * 10/2001 Bedi et al. ................... 184/1.5

* cited by examiner

*Primary Examiner*—Chong H. Kim
(74) *Attorney, Agent, or Firm*—Ronald E. Smith; Smith & Hopen, P.A.

(57) ABSTRACT

An apparatus for enhancing the efficacy of an engine oil change includes an oil filter adapter positioned in sandwiched relation between an oil filter housing of an engine and an oil filter. A plurality of outlets formed in the oil filter adapter is in fluid communication with the oil filter inlet and with the oil filter housing. An air inlet formed in the oil filter adapter is in fluid communication with a source of compressed air so that when compressed air is admitted into the air inlet, the compressed air flows through the oil filter housing opening and into the oil pan. The compressed air dislodges residue from an oil pump screen when the engine is not running, dislodges residue from interior walls of the oil pan after the engine has been operated and shut down, and purges dirty oil and residue when dirty oil is drained from the oil pan.

5 Claims, 4 Drawing Sheets

APPARATUS FOR ENHANCING ENGINE OIL CHANGES

BACKGROUND OF INVENTION

1. Field of the Invention

This invention relates, generally, to devices having utility during an engine oil-changing procedure. More particularly, it relates to a hand-held kit that ensures a thorough cleaning of an engine oil system during an oil change.

2. Description of the Prior Art

Changing engine oil is one of the most important parts of engine maintenance. However, a routine oil change that consists of nothing more than draining used oil from an oil pan, replacing an oil filter, and re-charging an engine with new oil is not adequate to ensure a long life for the engine. Old oil residue and its by-products (varnish, carbon, and sludge) remain in the oil pump screen and in the oil pan, some of which eventually mixes with the new oil and degrades the quality thereof.

In recent years, chemical cleaning agents for removing oil residue and its by-products have become available. These chemical agents are added to the engine's oil system during engine operation. However, when the engine is stopped to enable the oil to be changed, the residue can settle quickly to the bottom of the oil pan and fail to flow out of the oil pan during the drainage process.

What is needed, then, is an apparatus and method for enabling the residue in an oil pan and the residue on an oil pump screen to be cleaned from the pan and from the screen, respectively, during an oil change.

The new oil change apparatus and method should also remove the oil residue and particles that settle down to the bottom of an oil pan and adhere to the oil pump screen when a conventional engine-cleaning additive has been used.

Thus, when new oil is charged into the engine oil system, it will not be mixed with dirty oil residue and the life of the engine will be extended.

However, in view of the prior art considered as a whole at the time the present invention was made, it was not obvious to those of ordinary skill in the pertinent art how the identified needs could be fulfilled.

SUMMARY OF INVENTION

The long-standing but heretofore unfulfilled need for an apparatus that enhances the usefulness of an engine oil change is now met by a new, useful, and nonobvious invention.

The inventive structure includes an oil filter adapter positioned in sandwiched relation between an underside of an oil filter housing and an oil filter. The oil filter adapter has an inlet adapted to receive compressed air from a remote source of compressed air and an outlet in fluid communication with the oil filter housing so that compressed air flows into the inlet, through the oil pump and screen and into the oil pan.

The novel apparatus further includes a screw extender having an internally threaded part that screwthreadedly engages an externally threaded screw that extends from the oil filter housing and an externally threaded part that is screwthreadedly engaged by the oil filter.

The novel method for changing engine oil includes the steps of disengaging a used oil filter from an oil filter housing by unscrewing the used oil filter from the externally threaded screw that extends from the oil filter housing and providing the above-described screw extender. The internally threaded part of the screw extender is screwthreadedly engaged onto the externally threaded screw that extends from the oil filter housing.

An oil filter adapter having a central aperture, an air inlet, and an air outlet formed therein is provided. The air inlet is in fluid communication with the air. The oil filter adapter is positioned into abutting, sealing relation to an underside of the oil filter housing and the central aperture formed in the oil filter adapter is configured and dimensioned to slidingly receive the screw extender. The used oil filter is screwthreadedly engaged onto the externally threaded part of the screw extender. This sandwiches the novel oil filter adapter between the oil filter housing and the oil filter.

A recessed area in the oil filter housing creates a hollow space between the underside of the oil filter housing and the oil filter adapter. The thoughbores formed in the oil filter adapter are in fluid communication with the recess of the oil filter housing, thereby allowing oil to flow into the oil filter.

Before the engine is operated, the air inlet of the novel oil filter adapter is connected to a source of compressed air and a control valve is opened so that compressed air flows into the air inlet, through the air outlet and into the oil pan. This cleans the oil pump screen by dislodging oil particles or other residue therefrom.

The engine is then started and an engine cleaner is slowly charged into the oil system after the engine has reached its normal operating temperature. The engine is shut off after a predetermined amount of time, usually about ten (10) minutes. After the engine has been shut off, the air inlet is again connected to the source of compressed air by opening the control valve for a predetermined amount of time such as two (2) minutes. This dislodges oil particles from the oil pump screen and the interior walls of the oil pan and places said particles into suspension with the oil.

The used oil is then drained from the oil pan with the control valve being gradually opened after the drain plug has been removed. Oil residue and particles dislodged from the oil pump screen and from the interior side walls of the oil pan are thus purged from the oil pan with the dirty oil.

An important object of the invention is to provide a reliable means for dislodging and removing oil particles from an oil pump screen during an engine oil changing procedure.

Another important object is to provide a reliable means for dislodging and removing oil particles from interior side walls of an oil pan by churning or agitating the oil and cleaner inside the pan.

A closely related object is to accomplish the foregoing object with a portable, inexpensive, and easy-to-use kit.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
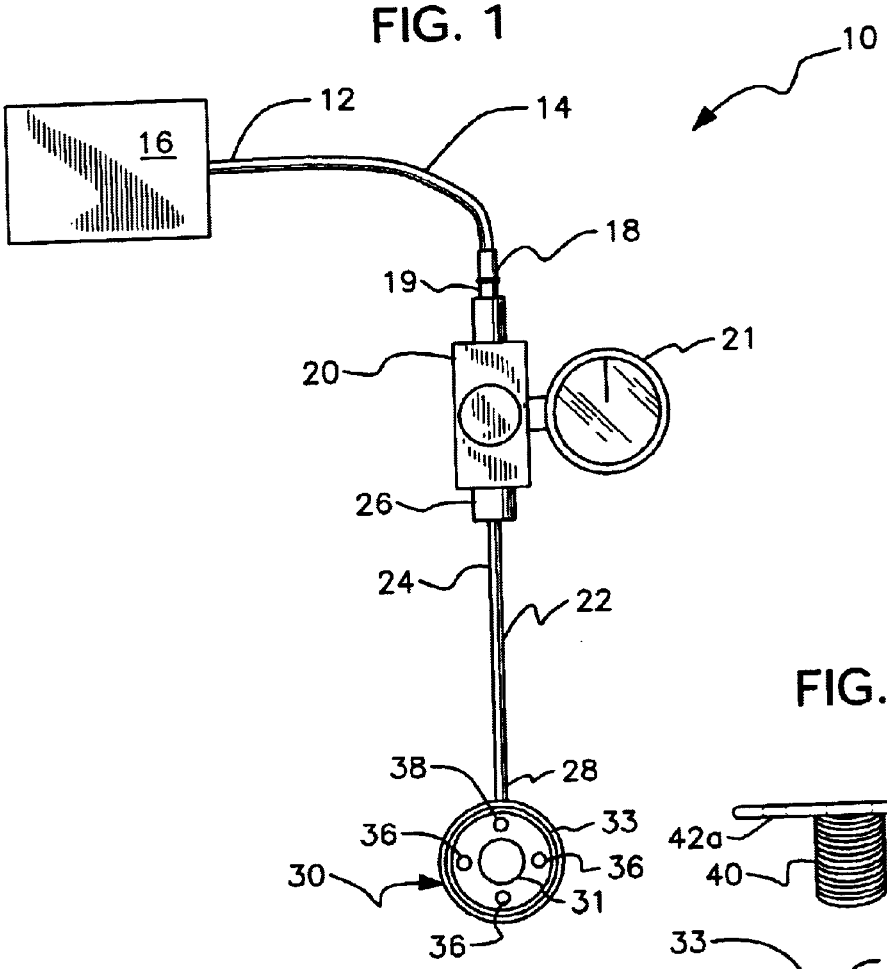
FIG. 1 is a diagrammatic view of the novel apparatus.

Referring now to FIG. 1, it will there be seen that the reference numeral 10 denotes an illustrative embodiment of the present invention.

When novel apparatus 10 is fully assembled, a first end 12 of first air hose 14 is connected to a suitable source of compressed air, such as a conventional air compressor 16. Most shops have an air compressor of the type suitable for use with the present invention.

Second end 18 of said first air hose is in fluid communication with inlet 19 of valve housing 20. A needle valve is the preferred type of control valve, but ball valves and other types of valves are also within the scope of this invention. A needle valve is preferred because it offers a higher degree of control. Gauge 21 is used for diagnostic purposes but it is not a part of the invention, per se .

Second air hose 22 has a first end 24 in fluid communication with outlet 26 of valve housing 20 and a second end 28 in fluid communication with oil filter adapter 30.

Figure 2:
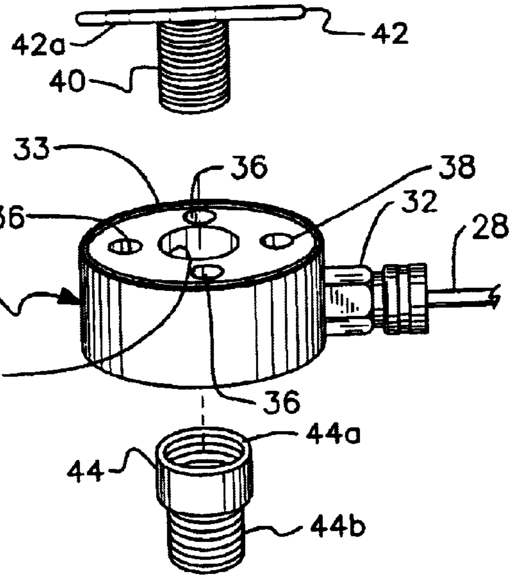
FIG. 2 is a diagrammatic view depicting how the novel apparatus is attached to an oil filter housing.

As best depicted in FIG. 2, said second end 28 is in fluid communication with a coupler or inlet means 32 that extends into oil filter adapter 30.

A plurality of throughbores, collectively denoted 36, is formed in oil filter adapter 30 and extends completely therethrough. However, bore 38 is positioned near the point where coupler 32 interconnects hose 22 to oil filter adapter 30 and said bore 38 is not a throughbore.

Throughbores 36 are interconnected by circular channel 34 formed in the oil filter housing. Accordingly, when the novel apparatus is used in the manner described below, compressed air flows into inlet means 32 and to bore 38 through said circular channel 34.

The upper end of oil filter adapter 30 is sealingly engaged against an underside of engine block 42. A recess 43 (FIG. 2) in oil filter housing of engine block 42 creates a hollow, empty space between the underside of engine block 42 and oil filter adapter 30. Note that throughbores 36 and opening 42*a* are in fluid communication with said recess 43. The compressed air therefore flows through bore 38 and into recess 43, upwardly through opening 42*a* downwardly into the oil pan, and at the same time downwardly to the bottom of the filter through throughbores 36 upwardly through the central bore of the oil filter, through the central opening of screw extender 44, and into the oil passages of the vehicle.

To install the novel apparatus, the used oil filter screwthreadedly engaged to externally threaded screw 40 (FIG. 2) formed integrally with engine block 42 is removed. The internally threaded part 44*a* of screw extender 44 is then screwthreadedly engaged to said externally threaded screw 40. Oil filter adapter 30 is then positioned in abutting relation to the underside of engine block 42 and the used oil filter is screwthreadedly engaged to the externally threaded part 44*b* of screw extender 44. Annular seal 33 abuts underside 42. Thus it is understood that the purpose of screw extender 44 is to lengthen the effective length of externally threaded screw 40. If the vehicle manufacturer were to lengthen externally threaded screw 40 so that it would extend through central opening 31 of oil filter adapter 30 by an amount sufficient to provide a mount for the oil filter, then screw extender 44 would not be needed.

When oil filter adapter 30 is securely in place, hose 14 is connected to compressor 16 and control valve or nozzle means 20 is opened for about a minute. The engine does not operate during this procedure. Compressed air flows into the oil pan and cleans residue and other particles from the oil pump screen, not shown.

The oil pump screen is disposed within the interior of the oil pan. The screen will be clean after about ten (10) seconds for most engines, but some very dirty screens could require as much as two (2) minutes.

Control valve 20 is closed when the oil pump screen is clean. New oil is then added to the engine if required to bring the fluid level to the "Full" mark on the oil dipstick. Before the engine is started, control valve 20 is closed and hose 14 is disconnected from compressor 16.

The engine is then started and gauge 21 is observed. A backpressure of less than twenty pounds indicates extreme engine wear, a weak oil pump, or a bad pressure relief valve. When such low backpressure is observed, the inventive cleaning apparatus should not be used.

If the backpressure is above twenty pounds, indicating a normal engine, engine cleaner is added slowly and the engine is operated until it reaches an operating temperature of at least one hundred fifty degrees Fahrenheit (150° F.). The engine is allowed to run until it is visually clean. This may take about ten (10) minutes. The engine is then ready to be backflushed.

Although a modern engine cleaner of the type provided by Enginewity, Inc., of Clearwater, Fla. under the trademark Enginewity ® engine cleaner greatly enhances the novel oil-changing procedure, it should be understood that the novel cleaning apparatus also has some utility even in the absence of an engine cleaning fluid. However, use of the engine cleaning fluid greatly enhances the effectiveness of the novel procedure.

To backflush the engine, it is turned off and the vehicle is raised on a lift. Air line 14 is re-connected to compressor 16 and control valve 20 is opened to circulate the cleaner in the oil pan for an additional two minutes. The engine is then ready for purging.

To purge the oil and the cleaning fluid, an oil drain pail or drum is placed under the vehicle. With control valve 20 closed, the drain plug is removed from the oil pan. Control valve 20 is then opened slowly and left on until the oil pan has been completely purged.

The oil filter, oil filter adapter 30, and screw extender 44 are then removed and the drain plug is replaced. A new filter is installed and new engine oil is added to the system in the conventional manner. Since the engine has been completely purged of oil, it should be turned over a few times by bumping the starter before starting the engine.

Thus it is understood that compressed air is introduced into the oil pan at three different times during the novel method. When the compressed air is introduced before the engine is started, it cleans hardened oil deposits from the oil pump screen that is positioned inside the oil pan. This improves oil circulation. When the compressed air is introduced into the oil pan after the engine has been operated, it agitates the oil and cleaner knocking oil residue from the internal walls of the oil pan, and causes oil residue particles to enter into suspension with the oil in the oil pan. When the compressed air is admitted into the oil pan during the draining process, it ensures the complete purging of all oil and residue from the oil pan.

Figure 3A:
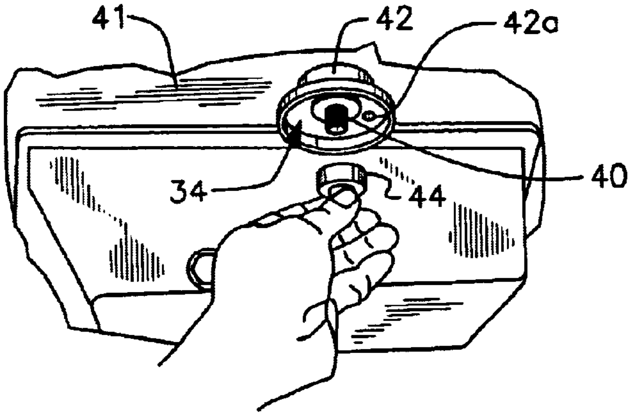
FIG. 3A is the first view of a seven figure animation depicting the steps of the novel method.
Figure 3B:
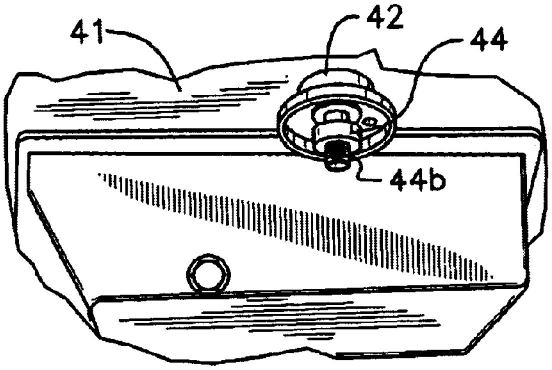
FIG. 3B is the second view of said seven figure animation.

FIGS. 3A–G provide an animation that substantially discloses the steps of the novel method. The first step of the novel method is to remove a used oil filter from the externally threaded screw 40 (FIG. 2) that extends from the bottom of an oil filter housing. That initial step is not depicted. Next, internally threaded 44*a* part of screw extender 44 is screwthreadedly engaged to externally threaded screw 40 as depicted in FIGS. 3A and 3B. Note that the externally threaded part 44*b* of screw extender 44 has the same diameter as screw 40 and thus performs the function its name expresses. Note also opening 42*a* in the underside of oil filter housing 42, just to the right of screw 40.

Figure 3C:
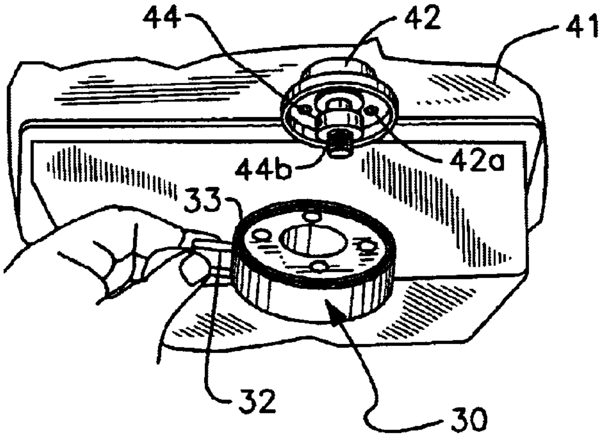
FIG. 3C is the third view of said seven figure animation.
Figure 3D:
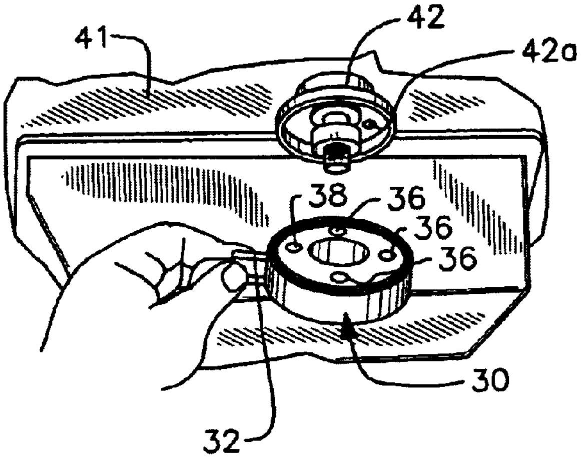
FIG. 3D is the fourth view of said seven figure animation.
Figure 3E:
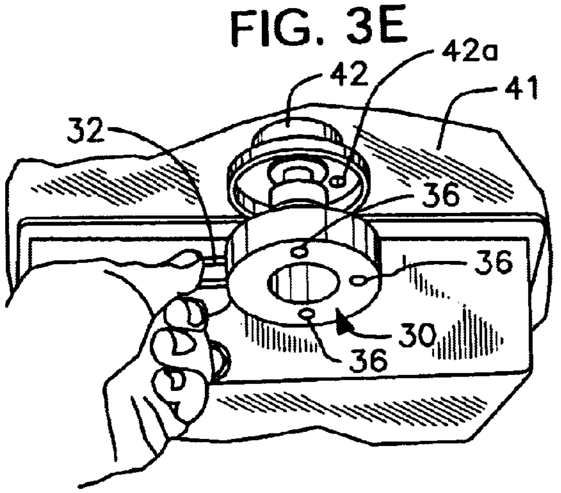
FIG. 3E is the fifth view of said seven figure animation.
Figure 3F:
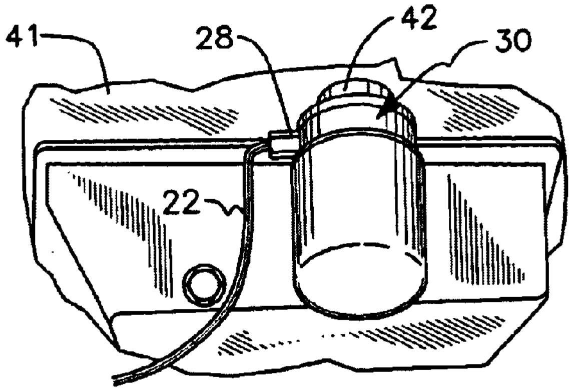
FIG. 3F is the sixth view of said seven figure animation.

Next, as depicted in FIGS. 3C–E, a first side of oil filter adapter 30 (the side having annular seal 33) is brought into abutting relation to the underside of oil filter housing 42. Central aperture 31 of oil filter adapter 30 has a diameter slightly greater than the diameter of screw extender 44 so said central aperture receives said screw extender and does not block access to externally threaded part 44*b* thereof. This enables the screwthreaded engagement of the used filter to part 44*b* as depicted in FIG. 3F. FIG. 3F also depicts air hose 22 that provides fluid communication between the inlet of oil filter adapter 30 and control valve 20.

Figure 3G:
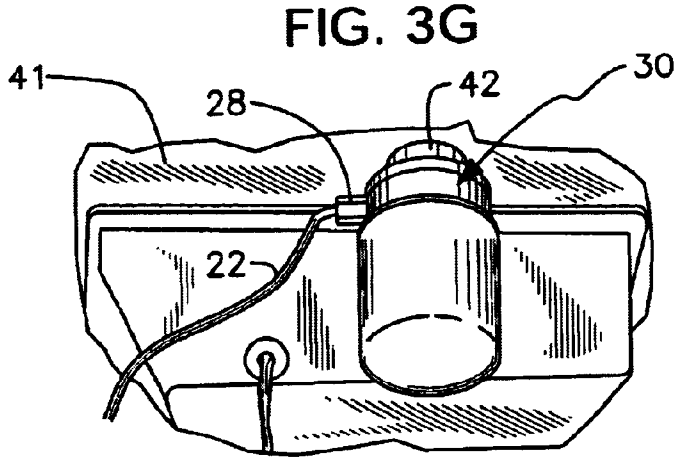
FIG. 3G is the seventh view of said seven figure animation.

After the compressed air has been admitted into the inlet of oil filter adapter 30, said compressed air flows into the oil pan through engine block opening 42*a* and particles of oil adhered to the oil pump screen positioned within the oil pan are dislodged by the compressed air and placed into suspension with the used oil as mentioned earlier. After the engine has been operated as aforesaid, air hose 14 is reconnected and compressed air is circulated within the oil pan for about two minutes. Accordingly, such particles are placed into suspension and removed from the oil pan when the used oil is drained therefrom as depicted in FIG. 3G. As mentioned earlier, control valve 20 is opened slowly during the draining process to ensure a complete purging.

The used filter, oil filter adapter 30, and screw extender 44 are then removed and a new oil filter is installed prior to charging new oil into the engine.

Figure 4:
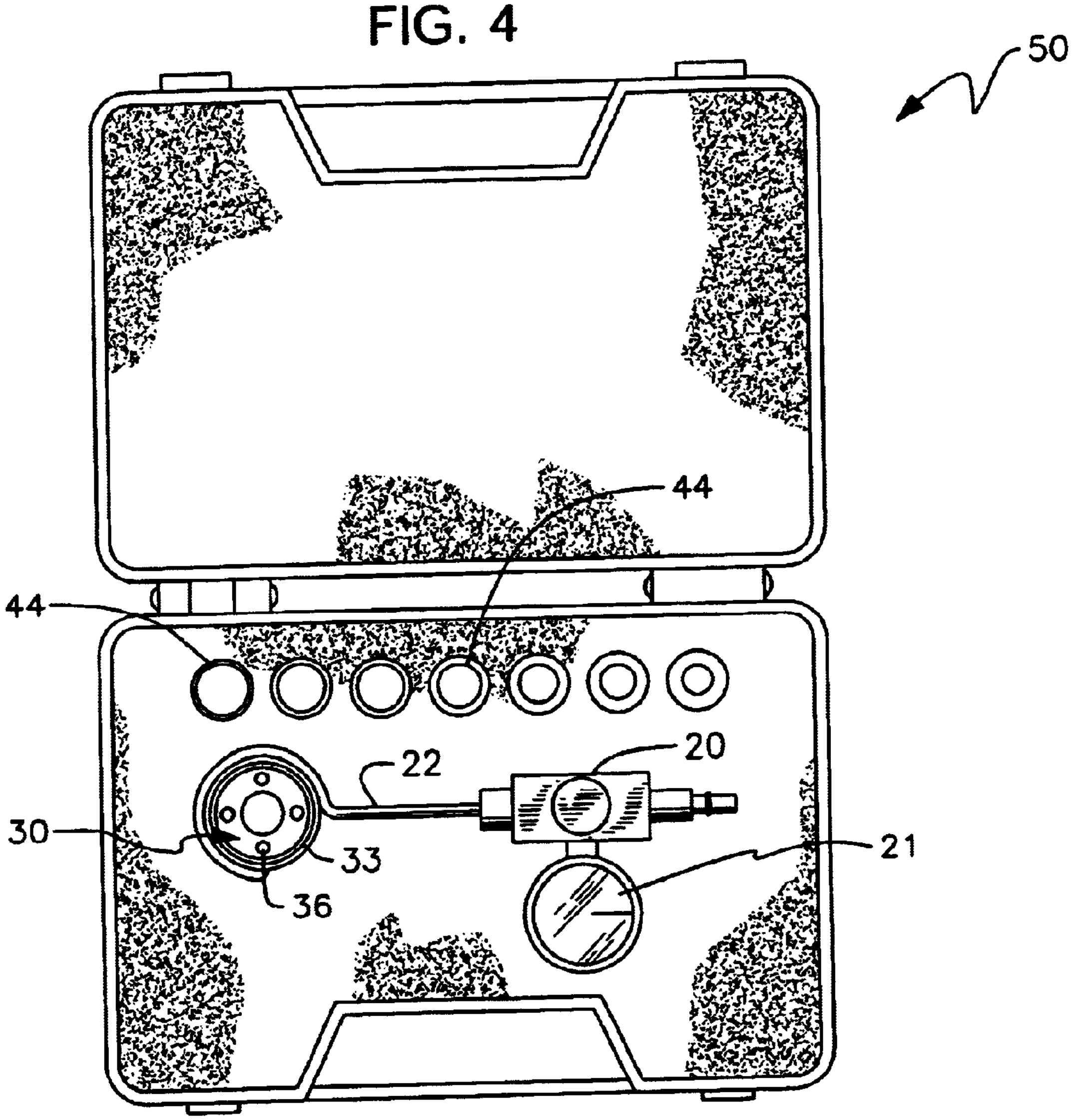
FIG. 4 is a perspective view of the novel kit.

All needed parts may be kept in a kit 50 as depicted in FIG. 4. Kit 50 includes a plurality of screw extenders of differing diameters, collectively denoted 44, so that the novel apparatus may be used with all makes and models. An annular adapter that fits around the periphery of oil filter adapter 30 may also be provided to effectively increase the diameter of said oil filter adapter 30.

The novel apparatus and method thus prolong engine life by enabling a more thorough engine oil change than heretofore known. The apparatus is easy to use and the method is easy to learn. Moreover, the kit is light-in-weight, portable, and inexpensive.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described.

What is claimed is:

1. An apparatus that enhances the efficacy of an engine oil change, comprising:

an oil filter adapter;

said oil filter adapter having a disk shape and a central aperture;

said oil filter adapter having a first side adapted to sealingly engage an underside of an oil filter housing;

said oil filter adapter having a second side adapted to abuttingly engage an oil filter;

said central aperture of said oil filter adapter being adapted to slidingly receive an externally threaded screw that extends from said underside of said oil filter housing;

a screw extender having an internally threaded part adapted to screw threadedly engage said externally threaded screw;

said screw extender also having an externally threaded part adapted to screw threadedly engage said oil filter;

said oil filter adapter having a plurality of throughbores formed therein, said throughbores being in fluid communication with an interior of said oil filter;

control valve means for introducing compressed air into said oil filter adapter, said control valve means adapted to be in fluid communication with a source of compressed air;

whereby compressed air is introduced into said oil filter housing and into said oil pan when said control valve means is open.

2. The apparatus of claim 1, wherein an elongate flexible hose provides fluid communication between said control valve means and said source of compressed air.

3. A method for changing engine oil in an engine, comprising the steps of:

disengaging a used oil filter by unscrewing said used oil filter from an externally threaded screw that extends from an oil filter housing;

providing a screw extender having an internally threaded part and an externally threaded part;

screwthreadedly engaging said internally threaded part of said screw extender onto said externally threaded screw;

providing an oil filter adapter having a central aperture, an air inlet, and an air outlet formed therein, said air inlet being in fluid communication with the compressed air;

positioning said oil filter adapter into abutting relation to an underside of said oil filter housing, having a recess creating a hollow empty space in fluid communication with said air outlet, throughbores, and in fluid communication with an opening formed in said underside of said oil filter housing;

said central aperture formed in said oil filter adapter being configured and dimensioned to slidingly receive said screw extender;

screwthreadedly engaging said used oil filter onto said externally threaded part of said screw extender;

positioning a control valve means in controlling relation between said air inlet of said oil filter adapter and a source of compressed air;

opening said control valve for a predetermined amount of time when said engine is not operating so that compressed air flows into said air inlet, through said opening formed in said underside of said oil filter housing, and into said oil pan;

closing said control valve to disconnect said air inlet from said source of compressed air;

starting said engine and operating it until it reaches its operating temperature;

turning off said engine;

opening said control means for a predetermined amount of time to re-connect said oil filter adapter to said source of compressed air;

closing said control valve upon expiration of said predetermined amount of time;

removing said drain plug so that oil begins draining from said oil pan;

slowly opening said control valve for a predetermined amount of time to purge said oil pan;

closing said control valve when oil and residue have been substantially purged from said oil pan;

re-connecting said drain plug; and installing a new oil filter and new engine oil;

whereby said compressed air dislodges oil particles from said oil pump screen before said engine is started;

whereby said compressed air dislodges oil particles from interior walls of said oil pan after said engine has been operated; and whereby said compressed air substantially purges dirty oil and residue from said oil pan during the draining procedure.

4. The method of claim 3, further comprising the step of slowly adding an engine cleaner when the engine is started.

5. The method of claim 3, further comprising the step of checking engine oil pressure prior to performing the steps of the method so that the method is not performed if engine oil pressure is below a predetermined threshold.

* * * * *